United States Patent

Okihara et al.

[11] Patent Number: 5,173,137
[45] Date of Patent: Dec. 22, 1992

[54] PNEUMATIC TIRE WITH IMPROVED DURABILITY OF THE BEAD PORTION

[75] Inventors: Masakazu Okihara, Hiratsuka; Tomohiko Kogure, Ashigara; Yusaku Miyazaki, Hiratsuka; Tuneo Morikawa, Hadano; Toru Horikawa, Hiratsuka, all of Japan

[73] Assignee: The Yokohama Rubber Co., Ltd., Tokyo, Japan

[21] Appl. No.: 700,273

[22] Filed: May 15, 1991

[30] Foreign Application Priority Data

Jul. 9, 1990 [JP] Japan .................................. 2-179635

[51] Int. Cl.⁵ ............................ B60C 9/02; B60C 9/04
[52] U.S. Cl. ...................................... 152/552; 152/548; 152/556; 156/110.1
[58] Field of Search ............... 152/548, 552, 556, 560, 152/526; 83/581; 156/304.5, 110.1

[56] References Cited

U.S. PATENT DOCUMENTS

| | | | |
|---|---|---|---|
| 3,237,673 | 3/1966 | Ward | 156/304.5 X |
| 3,297,073 | 1/1967 | Black et al. | 152/548 X |
| 3,736,972 | 6/1973 | Petraschek et al. | 152/548 X |
| 4,850,412 | 7/1989 | Gupta | 152/560 X |

FOREIGN PATENT DOCUMENTS

| | | | |
|---|---|---|---|
| 0350944 | 1/1990 | European Pat. Off. | 152/556 |
| 0356159 | 2/1990 | European Pat. Off. | 152/556 |
| 3515944 | 11/1986 | Fed. Rep. of Germany | 152/548 |
| 1290294 | 3/1962 | France | 152/526 |

Primary Examiner—Michael W. Ball
Assistant Examiner—Adrienne C. Johnstone
Attorney, Agent, or Firm—Nikaido, Marmelstein, Murray & Oram

[57] ABSTRACT

A pneumatic tire characterized in that a carcass layer is constructed by arranging non-twisted polyamide monofilament cords each having a flat cross-section such that the major axis of said flat cross-section is disposed along the surface direction of said carcass layer, that said carcass layer is fold up from the inside to the outside of said tire around a bead portion, and that the folded-up end portions are constructed such that the thickness thereof becomes smaller toward the distal end thereof.

4 Claims, 5 Drawing Sheets

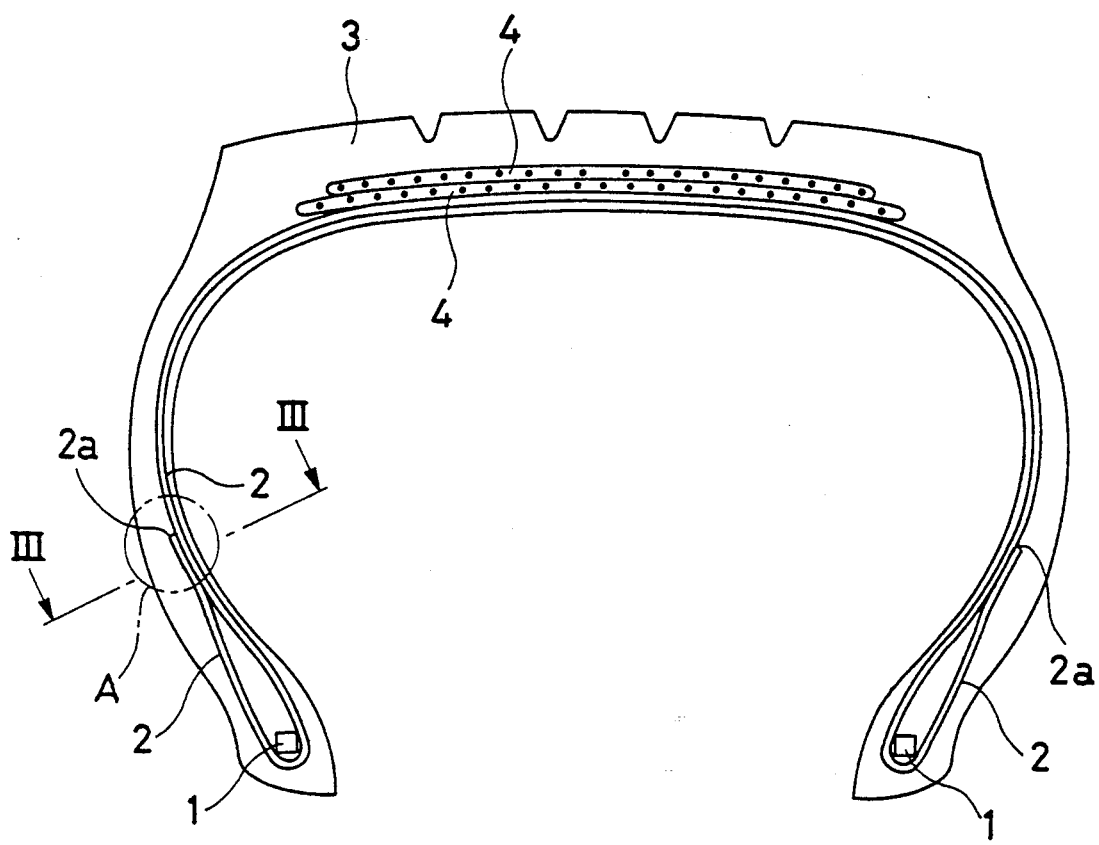
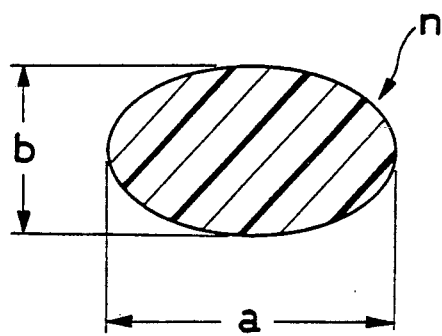

PNEUMATIC TIRE WITH IMPROVED DURABILITY OF THE BEAD PORTION

BACKGROUND OF THE INVENTION

The present invention relates to a pneumatic tire in which the weight-reduction and improvement of durability of a tire are accomplished by employing in a carcass layer cords each comprising non-twisted polyamide monofilaments having a flat cross-section, and more particularly to a pneumatic radial tire suitable for use on automobiles.

Conventionally, pneumatic tires have been proposed in which weight-reduction is accomplished by using non-twisted polyamide monofilament cords having a flat cross-section as reinforcement cords for a carcass layer.

However, the modulus of a polyamide monofilament cord having a flat cross-section is higher than that of a conventional twisted cord, and hence the polyamide monofilament cord has poor flexibility. Due to this, this type of high-modulus polyamide monofilament cords having a flat cross-section have a drawback that when folded up from the inside to the outside of a bead core as cords of a carcass layer, a great magnitude of stress is concentrated at the folded-up end portion which causes the cords to easily separate from rubber, decreasing durability at the bead portion.

SUMMARY OF THE INVENTION

An object of the present invention is to provide a pneumatic tire in which the weight-reduction of a tire and improvement of durability of the bead portion are accomplished even if polyamide monofilament cords each having a flat cross-section are used in the carcass layers.

A pneumatic tire made according to the present invention in order to accomplish the above object is characterized in that a carcass layer is constructed by arranging non-twisted polyamide monofilament cords each having a flat cross-section such that the major axis of the flat cross-section is disposed along the surface direction of the carcass layer, that the end of the carcass layer are folded up from the inside to the outside of bead cores on the left- and right-hand sides, respectively, and that the folded-up end portions are constructed such that the thickness thereof becomes smaller toward each end.

Thus, the carcass layer is made thinner by arranging non-twisted polyamide monofilament cords each having a flat cross-section such that the major axis of the flat cross-section is disposed along the surface direction of the carcass layer, whereby the weight-reduction of the tire is accomplished. In addition, by folding up the end portions of the carcass layer from the inside to the outside of the bead cores so that the thickness thereof becomes smaller toward the distal ends thereof, the stress applied to the end portions of the polyamide filament gradually becomes smaller toward the distal ends thereof, whereby the separation of the end portions of the carcass layer from rubber used is prevented, thereby improving the durability of the bead portions.

BRIEF DESCRIPTION OF THE DRAWINGS

FIG. 1 is a transverse cross-sectional view of a pneumatic radial tire for a passenger automobile according to an embodiment of the present invention;

FIG. 2 is a cross-sectional view of a polyamide monofilament code that is used for the carcass layer according to the present invention;

DESCRIPTION OF THE PREFERRED EMBODIMENTS

Figure 3:
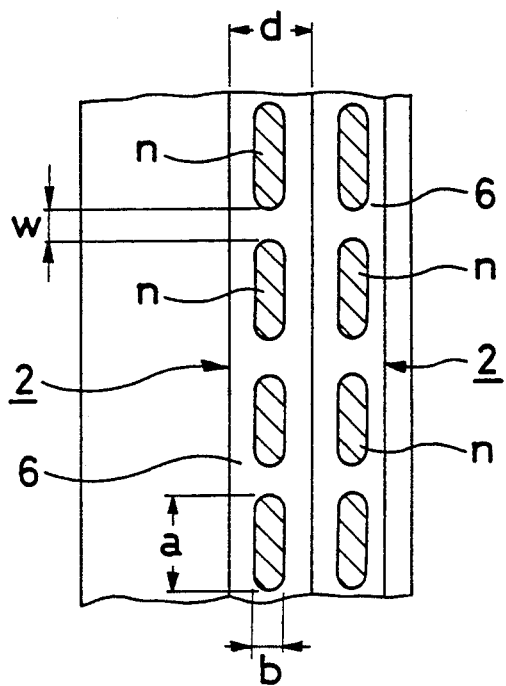
FIG. 3 is a cross-sectional view taken along the line III—III of FIG. 1.

In FIG. 1, reference numeral 1 denotes a bead core, reference numeral 2 a carcass layer, reference numeral 3 a tread portion, and reference numeral 4 denotes a belt layer. The ends of the carcass layer 2 are folded up around the bead core 1 from the inside to the outside of a tire. The carcass layer comprises at least one layer and are constituted by polyamide monofilament cords n (hereinafter, referred to as a cord n) which are disposed substantially at 70° to 90° with respect to the circumferential direction of the tire. As shown in FIG. 2, the crod n has an oval cross-section, and is not twisted over the full length thereof. Furthermore, as shown in FIG. 3, the crods n are arranged such that the major axis of each cord n is disposed along the surface direction of the carcass layer. The thickness d of the carcass layer 2 is made smaller by arranging the cords n such that the major axis a of each cord n is disposed along the surface direction of the carcass layer. As a result of this, the amount of a coat rubber 6 used is reduced, leading to the weight-reduction.

Figure 4:
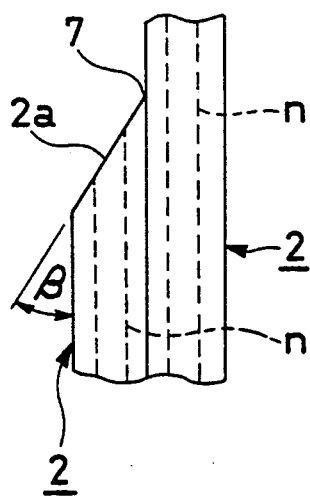
FIG. 4 is an enlarged view of the portion indicated by alphabetical reference character A of FIG. 1.

In addition, as shown in FIG. 4, the folded-up portions 2a of the carcass layer 2 is diagonally cut and are constructed such that the thickness thereof becomes smaller toward the distal end thereof 7. Furthermore, the end portions 2a of the carcass layer 2 are designed to directly adhere to the outer side surface of the main body of the carcass layer. Thus, the rigidity of the end portions 2a changes so as to gradually become small toward the distal end 7 of the carcass layer by designing the thickness of the end portion 2a of the carcass layer such that the thickness is gradually reduced toward the distal end 7 thereof. As a result of this, the separation of the end portion 2a of the carcass layer 2 from rubber can be prevented, whereby the durability of the bead portions can also be improved.

The inclination angle 8 of the end portion 2a of the carcass layer 2 with respect to the surface direction desirably falls within the range of 20° to 80°, and particularly within the range of 45° to 75°. If this inclination angle $\beta$ exceeds 80°, it is almost impossible to use an advantage gained by gradually reducing the rigidity of the end portion 2a of the carcass layer 2. In contrast, if the inclination angle $\beta$ is set to be below 20°, the formation of the end portion 2a of the carcass layer 2 becomes difficult, and moreover the area of the inclined surface of the end portion 2a is increased, the extent to which the cord n is exposed being thereby increased, the adhesion properties between the crod n and the coat rubber 6 being thereby deteriorated.

Figure 5A:
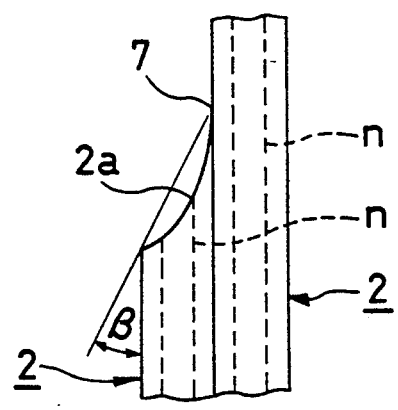
FIGS. 5(a) to 5(c) are diagrams explaining the end portions of the carcass layer on the folded-up side in other embodiments.
Figure 5B:
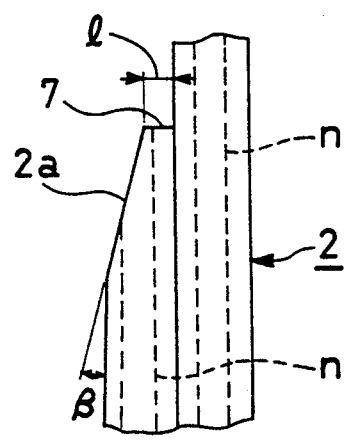
Figure 5C:
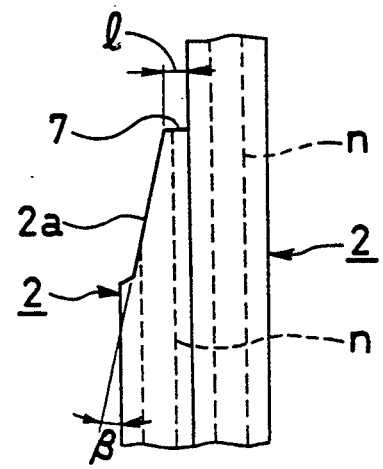

The configuration of the end portion 2a of the carcass layer 2 may be curved inwardly on the surface thereof as shown in FIG. 5(a). In addition, as shown in FIGS. 5(b) and 5(c), a certain thickness l may be maintained at the distal end 7 of the end portion 2a of the carcass layer. The thickness 1 of the carcass layer 2 is desirably half of the thickness d of the carcass layer or less.

There is no specific cross-sectional configuration of the cord n provided that it is flat. The cross-sectional configuration of the cord n may be oval as shown in FIG. 2, or as shown in FIG. 3, it may be formed into a rectangular shape with rounded corners. The flat ratio a/b determined by the major axis a and minor axis b of the cord n should be 2 to 6, and the ratio should desirably be 2 to 5.

The number of ends of the cord n in the carcass 2 is desirably 12 to 55 cords/50 mm. In this case, the distance w between the adjacent two cords n, n should not be too short. If the distance w is too short, when forming tires through vulcanization, construction will occur in the coat rubber 6 when it is inflated, or the coat rubber 6 becomes easily separated from the cord n. Due to this, it is desirable that the distance w be 0.1 mm or more in a green tire state.

6, 6 nylon (polyhexamethylene adipamide), 6 nylon (polycaprolactam), 4, 6 nylon (polytetramethylene adipamide) having fiber-forming properties, or a copolymer of the three may be used for polyamide fibers constituting the cord n.

The belt layer 4 is disposed when the tire according to the present invention is a radial one. This belt layer 4 comprises at least two layers, and are mainly constituted by steel cords of high rigidity or aromatic polyamide fiber cords.

Next, one example of methods for forming a carcass layer for a pneumatic tire constructed as described above according to the present invention will now be explained.

Figure 6A:
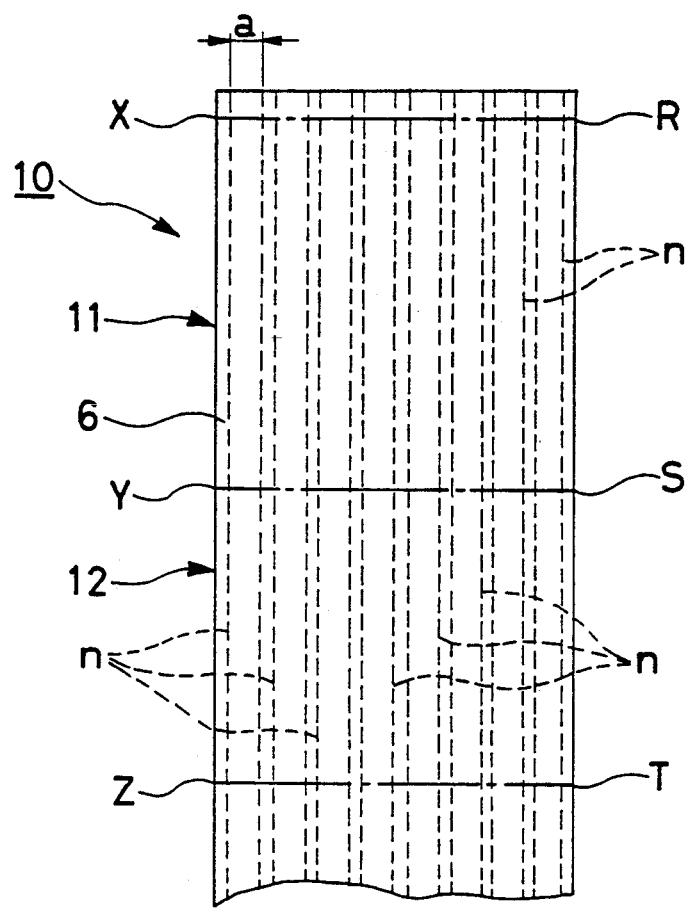
FIGS. 6(a) to 6(e) are diagrams explaining a method for forming a carcass layer.
Figure 6B:
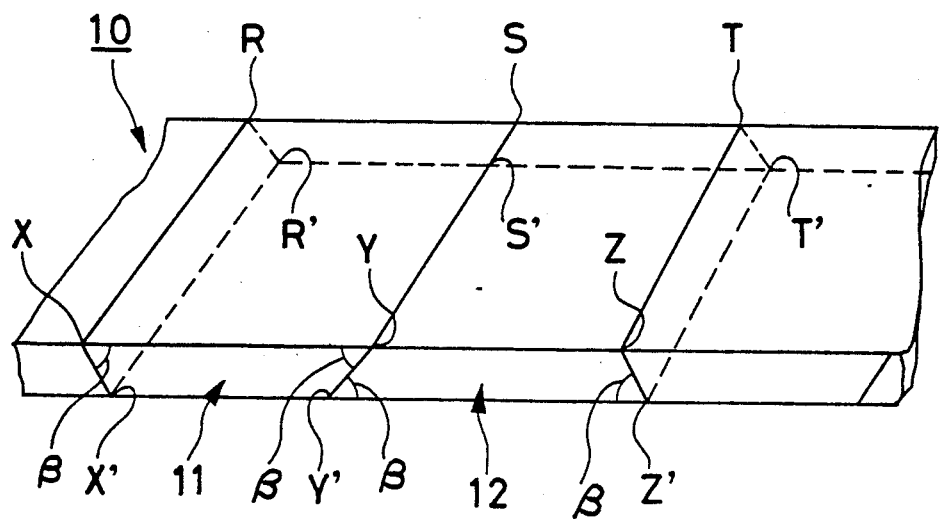
Figure 6C:
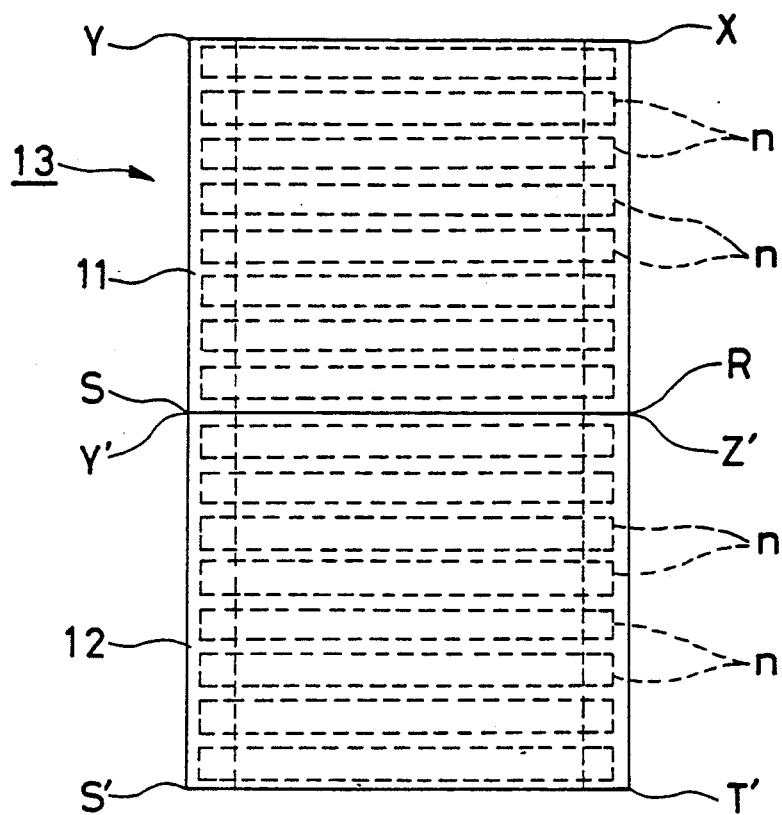
Figure 6D:
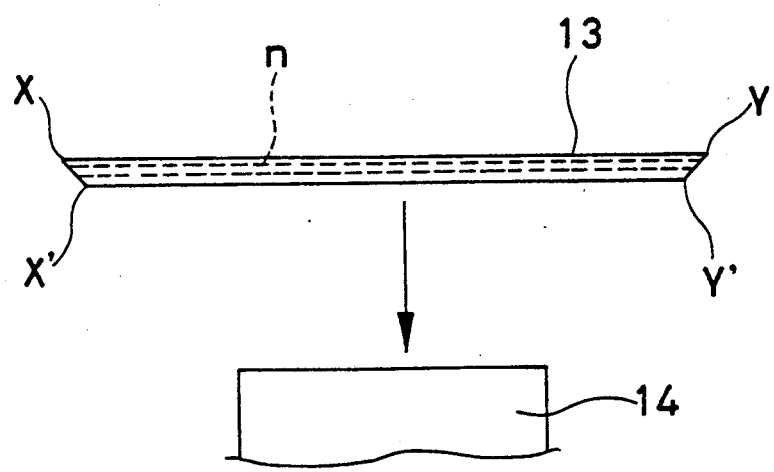
Figure 6E:
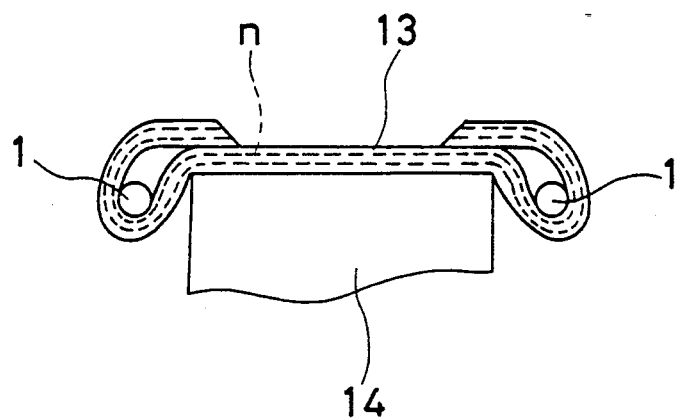

First, as shown in FIG. 6(a), a sheet-like substance 10 in which a multiplicity of non-twisted polyamide monofilament cords n each having a flat cross-section are arranged in the coat rubber such that the direction of the major axis a of the flat cross-section is disposed along the surface direction of the sheet is cut along lines XR, YS, and ZT, and diagonally with reference to the thickness direction so as to form sheet pieces 11, 12, ... . During this cutting operation, as shown in FIG. 6(b), cutting of the sheet-like substance is sequentially carried out so that the top sides $\overline{XY}$, $\overline{YZ}$ and the bottom sides $\overline{X'Y'}$, $\overline{Y'Z'}$ of adjacent sheet pieces 11, 12 have the following relationships, $\overline{XY} = \overline{Y'Z'}$ and $\overline{X'Y'} = \overline{YZ}$, and that angles <X'XY, <Y'YX, <Y'Y'Z', <ZZ'Y become equal to the above-mentioned inclination angle $\beta$ respectively. Out of the sheet pieces 11, 12 thus obtained, the sheet piece 12 is turned inside out so that the side $\overline{Y'Z'}$ thereof is sequentially joined to the $\overline{SR}$ side of the sheet piece 11, as shown in FIG. 6(c), to thereby form a carcass material 13 whose length is equal to the circumferential length of the tire. Next, as shown in FIG. 6(d), the carcass members 13 are wound around a forming drum 14 such that the narrower width surface $\overline{X'Y'}$ are brought into contact with the forming drum 14, and after lapse of a predetermined time, as shown in FIG. 6(e), a bead core 1 is disposed on the inside of the both end portions of the carcass member 13 on the forming drum 14, and these both end portions are then fold up around the bead core 1.

EXAMPLE

Three types of tires having an identical tire size of 175/70R13 and the following different constructions were prepared and are now identified as being PRESENT INVENTION TIRE, COMPARISON TIRE, and PRIOR ART TIRE. The tires were evaluated in terms of the load durability using the following test method, and the results were shown in Table 2.

The weight of PRESENT INVENTION and COMPARISON TIRE is identical, while when compared with PRIOR ART TIRE, the weight-reduction of 3% was effected with PRESENT INVENTION.

PRESENT INVENTION TIRE

Carcass layer: non-twisted polyamide monofilaments of 3000 denier and having an oval cross-section are arranged such that the major axis direction is disposed along the surface direction of the carcass layer thereof.

The number of ends of the carcass layer (before vulcanization): 35 cords/50 mm

Configuration of the end portion: inclination angle $\beta = 60°$

COMPARISON TIRE

The cord and the number of ends (before vulcanization) of the carcass layer are the same as those of PRESENT INVENTION TIRE.

Configuration of the end portion: inclination angle $\beta = 90°$

PRIOR ART TIRE

Carcass layer: polyester multifilament cords of 1500d/2 are arranged with the number of ends (before vulcanization) of 50 cords/50 mm Configuration of the end portion: inclination angle $\beta = 90°$

METHOD OF EVALUATING THE LOAD DURABILITY PERFORMANCE

The tires were run on the drum running test machine under the following running conditions until failures occurred on the bead portion of the tires, and the mileages at which the failures occurred were measured. The results were represented using indexes with the mileage of PRIOR ART TIRE being set at 100.

(1) Running conditions
Running speed: 81 km/h
Rim: 13×5 J
Air pressure: 1.9 kgf/cm$^2$
Load: refer to Table 1

TABLE 1

| | LOAD & TEST TIME | |
| --- | --- | --- |
| TEST STAGES | LOAD (KG) | TEST TIME (H) |
| 1 | 405 | 4 |
| 2 | 446 | 6 |
| 3 | 475 | 24 |
| 4 | 546 | 4 |
| 5 | 617 | 4 |
| . | incremented by 71 kg every four hours until 1327 kg was reached | . |
| n | 1327 | continued until failures occurred |

TABLE 2

| | INDEX |
| --- | --- |
| PRESENT INVENTION TIRE | 110 |

TABLE 2-continued

| | INDEX |
|---|---|
| PRIOR TIRE | 100 |
| COMPARISON TIRE | 90 |

It is seen from Table 2 that PRESENT INVENTION TIRE runs longer distance before failure occurs and has superior durability at the bead portions when compared with CONVENTIONAL and COMPARISON TIRES.

What is claimed is:

1. A pneumatic tire characterized in that a carcass layer is constructed by arranging non-twisted polyamide monofilament cords each having a flat cross-section such that the major axis of said flat cross-section is disposed along a surface direction of said carcass layer, that said carcass layer is folded up from the inside to the outside of said tire around a bead portion, and that the folded-up end portions are constructed such that the thickness thereof becomes smaller toward the distal end thereof, wherein an additional angle $\beta$ of the end portion of said carcass layer with reference to the surface direction of said carcass layer ranges from 45 degrees to 75 degrees.

2. A pneumatic tire as set forth in claim 1, wherein said distal ends of said carcass layer are directly bonded to the outer side surfaces of a main body of said carcass layer.

3. A tire according to claim 1, wherein the thickness of the folded up end portions decreases arcuately.

4. A tire according to claim 1, wherein the thickness of said folded-up end portions at the distal end thereof is no greater than one-half of the thickness of said carcass layer.

* * * * *